US006907842B2

(12) United States Patent
Godshaw

(10) Patent No.: US 6,907,842 B2
(45) Date of Patent: Jun. 21, 2005

(54) COMBINATION PET BED AND CARRYING CASE

(75) Inventor: Donald E. Godshaw, Evanston, IL (US)

(73) Assignee: Travel Caddy, Inc., Des Plaines, IL (US)

( * ) Notice: Subject to any disclaimer, the term of this patent is extended or adjusted under 35 U.S.C. 154(b) by 0 days.

(21) Appl. No.: 10/388,047

(22) Filed: Mar. 13, 2003

(65) Prior Publication Data

US 2004/0177814 A1 Sep. 16, 2004

(51) Int. Cl.[7] .............................. A01K 29/00; A45F 4/02
(52) U.S. Cl. .................... 119/28.5; 224/155; 297/250.1
(58) Field of Search ................. 224/153, 155, 224/156; 119/28.5, 473, 474, 496, 499, 771; 297/118, 119, 184.13, 255, 256.15

(56) References Cited

U.S. PATENT DOCUMENTS

| | | | | |
|---|---|---|---|---|
| 3,763,972 A | * | 10/1973 | Karzmar | 190/8 |
| 4,236,657 A | * | 12/1980 | Brunton | 224/153 |
| 4,836,605 A | * | 6/1989 | Greenwood et al. | 297/250.1 |
| 5,230,450 A | * | 7/1993 | Mahvi et al. | 224/153 |
| 5,544,792 A | * | 8/1996 | Arnwine | 224/153 |
| 5,573,155 A | * | 11/1996 | Sadler | 224/155 |
| 5,785,219 A | * | 7/1998 | Kraft | 224/576 |
| 5,819,999 A | * | 10/1998 | Tennant | 224/155 |
| 6,042,186 A | * | 3/2000 | Kojic et al. | 297/452.41 |
| 6,223,691 B1 | * | 5/2001 | Beattie | 119/453 |
| 6,390,345 B1 | * | 5/2002 | Brown et al. | 224/578 |
| D461,966 S | * | 8/2002 | Reece | D6/356 |
| 2002/0000741 A1 | * | 1/2002 | Clay et al. | 297/118 |
| 2002/0167214 A1 | * | 11/2002 | Nelson et al. | 297/485 |

\* cited by examiner

Primary Examiner—Teri Pham Luu
Assistant Examiner—Susan C. Alimenti
(74) Attorney, Agent, or Firm—Banner & Witcoff, Ltd.

(57) ABSTRACT

A combination pet bed and carrying case includes a pet bed with a bottom cushion arrangement that is attachable to the top of a carrying case when the case serves as a support base for the pet bed. The pet bed may be removed from attachment to the carrying case to provide for a pet bed with an extended cushion in the form of a lounge for the pet.

46 Claims, 3 Drawing Sheets

COMBINATION PET BED AND CARRYING CASE

BACKGROUND OF THE INVENTION

In a principal aspect the present invention relates to a pet bed and an associated carrying case especially useful in a vehicle as a seat or bed for a pet.

Beds for pets, especially dogs and cats, typically include a bottom cushion and a peripheral side cushion or panel often retained in a box or box shaped container. On occasion, such pet beds are manufactured from molded plastic, wicker or similar materials which form an outside container or basket with cushions placed within the interior of the bed basket.

Such pet beds are typically designed for use in a home environment. They are not typically designed for use when traveling in a vehicle, although many pet owners will place such beds on the back seat of a vehicle, for example, so that the pet may rest or sit in such a bed. Such pet beds are difficult to anchor to a seat, however, and may pose a hazard to the pet as well as vehicle passengers in the event of a sudden stop by the vehicle.

Nonetheless, many owners of pets desire to transport their pets with them in a vehicle. Thus, there has developed a need for a pet bed which can be incorporated in a vehicle, yet which will have utilitarian value in the home environment. Further, it is desirable to have a pet bed which will enable the pet to sit in the bed and observe their surroundings, particularly through the windows of a vehicle. Finally, it is desirable to have a pet bed which can be easily transported between a home environment and a vehicle environment and thus can be easily packed for such transport. These, among other desires and features, inspired the development of the present invention.

SUMMARY OF THE INVENTION

Briefly, the present invention comprises a pet bed and carrying case combination. The pet bed is comprised of a pair of base cushions which are hinged together along one side of each cushion by means of a flexible fabric or material hinge. The base cushions may be folded about the hinge to overlie one another and thereby form the base of the pet bed. A circumferential or peripheral cushion or side panel is incorporated on one of the base cushions. A screen mesh removable front panel encloses the peripheral side panel which extends around a portion of the top base cushion to provide a full enclosure for retaining the pet on and in the bed. The bottom base cushion, of the two base cushions forming the base of the pet bed, may be folded outwardly from the top cushion and when extended therefrom forms a chaise lounge for the pet.

A separate carrying case is provided and includes a top lid, a bottom panel and a peripheral side panel. The top lid includes retention straps which cooperate with the bottom base cushion of the pet bed to retain the pet bed on the top of the carrying case. Various straps and buckles are provided for retention of the pet bed on the carrying case as well as on a vehicle seat.

In a preferred embodiment of the invention, the pet bed is made from an expandable foam polymeric material so that the bed may be compressed and folded for storage in the carrying case. The carrying case includes an access panel through a peripheral side wall to provide access to the contents thereof. The interior of the carrying case includes dividers which may be raised and lowered, depending upon whether the pet bed is stored within the carrying case.

The assembly of the carrying case and base cushions may be positioned on the back seat of an automobile, for example, and attached to the seat belts associated with the vehicle to retain the pet bed and carrying case in combination for the safety of the pet. The pet bed may be used with or without the carrying case serving as a support base. In other words, the carrying case may serve as a base for the pet bed to elevate the pet bed, particularly when in the back seat of a vehicle so that the pet can view its surroundings from the pet bed. However, the use of the carrying case as a support base may be omitted.

Thus, it is an object of the invention to provide an improved pet bed construction which may be used as a pet bed or which may be used in combination with its own carrying case as a support base or which may be converted by manipulation of the cushions forming the pet bed into the form of a chaise lounge.

A further object of the invention is to provide a pet bed and carrying case combination which may be used for transport of a pet in a vehicle in a manner which enhances the safety of the pet.

Another object of the invention is to provide a carrying case for a pet bed which may serve the dual function of housing a pet bed and which may also store various items that will be useful in the care of the pet, such as pet food, feeding bowls and the like.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
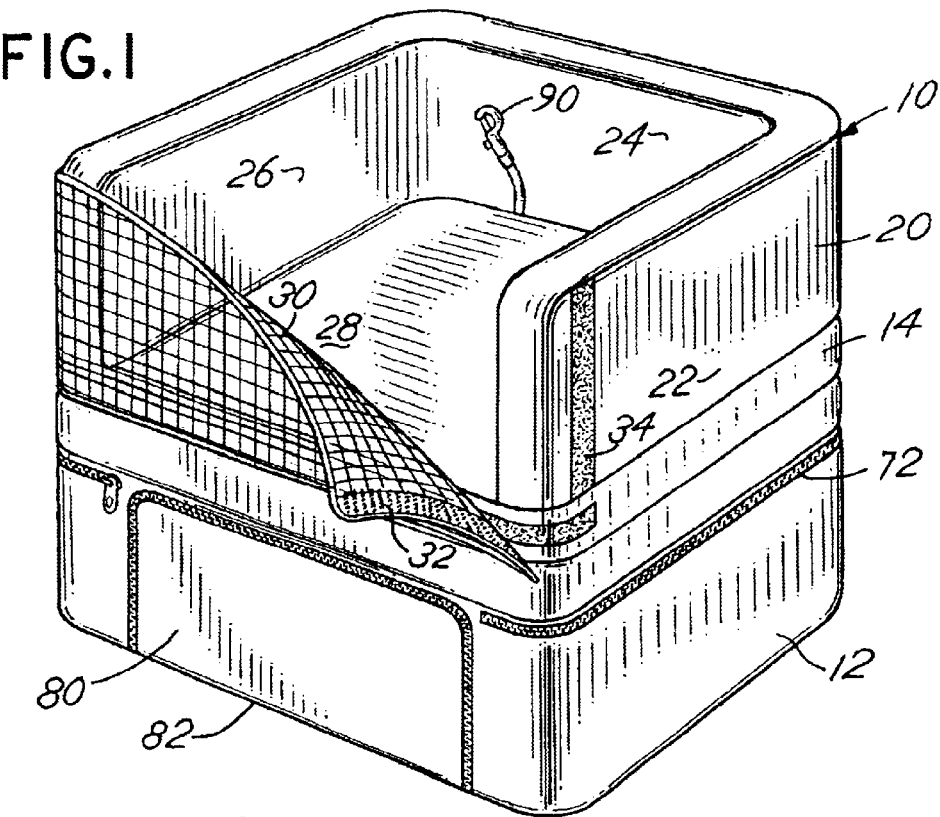
FIG. 1 is an isometric view of the combination pet bed and carrying case wherein the pet bed has been assembled on the top of the carrying case in a manner whereby the carrying case serves as a pedestal.
Figure 2:
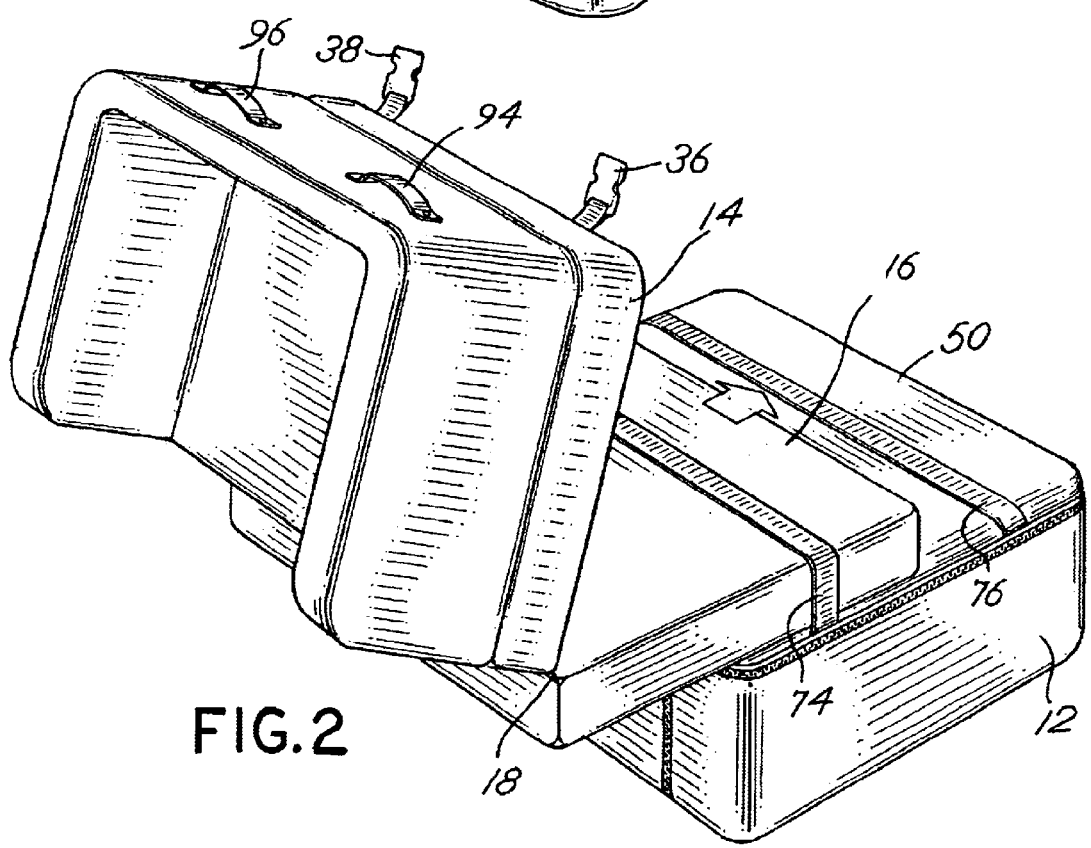
FIG. 2 is an isometric view of the assembly of FIG. 1 wherein the pet bed is depicted partially removed from the carrying case pedestal.

Referring to the figures, the pet bed and carrying case combination of the invention is comprised of two principal component parts; namely, a pet bed 10 and a carrying case 12. The pet bed 10 includes a first base or top cushion 14 and a second base or bottom cushion 16 which is hinged to the first bottom cushion 14 by means of a fabric or flexible hinge 18 thereby permitting the second cushion 16 to be pivoted about the hinge connection 18 between the position shown, for example, in FIG. 1 and the position shown in FIG. 4. In a preferred embodiment, at least the first or top cushion 14 is made from a cushion material. The second cushion 16 is preferably made from similar cushion material but such a construction is not necessary. That is, the second cushion 16 may be made from a thinner non-compressible, non-cushion type material. The cushions 14, 16 are typically identical in size and shape and have the form of a rectangular parallelapiped. The size of cushions 14, 16 may vary depending upon the size of pet for which the pet bed is to be used. Typically cushions 14, 16 have a square top plan dimension of 18 to 24 inches and a thickness of 2 to 4 inches. Cushions 14, 16 are fabric covered compressible polymeric or cellular foam cushions, for example.

The pet bed further includes a peripheral side wall 20 which includes a first lateral side wall 22, a back side wall 24 and a second opposite lateral side wall 26 which is opposite and parallel to the first lateral side wall 22. In a preferred embodiment, the cushions 14 and 16 are generally rectangular in shape and the side walls 22, 24 and 26 are affixed to and comprise upward extensions from the top of top side 28 of top cushion 14 to enclose three of the four sides of the rectangle formed by the top cushion 14. A flexible and removable mesh fabric panel 30 is provided to define a front side wall for an enclosure for a pet on the cushion 14. The panel 30 includes hook and eye fasteners (for example, Velcro fasteners 32) which cooperate with compatible fasteners 34 provided on the outside walls of the peripheral side wall 22. Similarly, hook and eye (Velcro type) fasteners are provided along the other sides of the panel 30 for attachment of the panel 30 and for permitted removal of the panel 30 from engagement with the top cushion 14 and the side walls 22 and 26.

Figure 5:
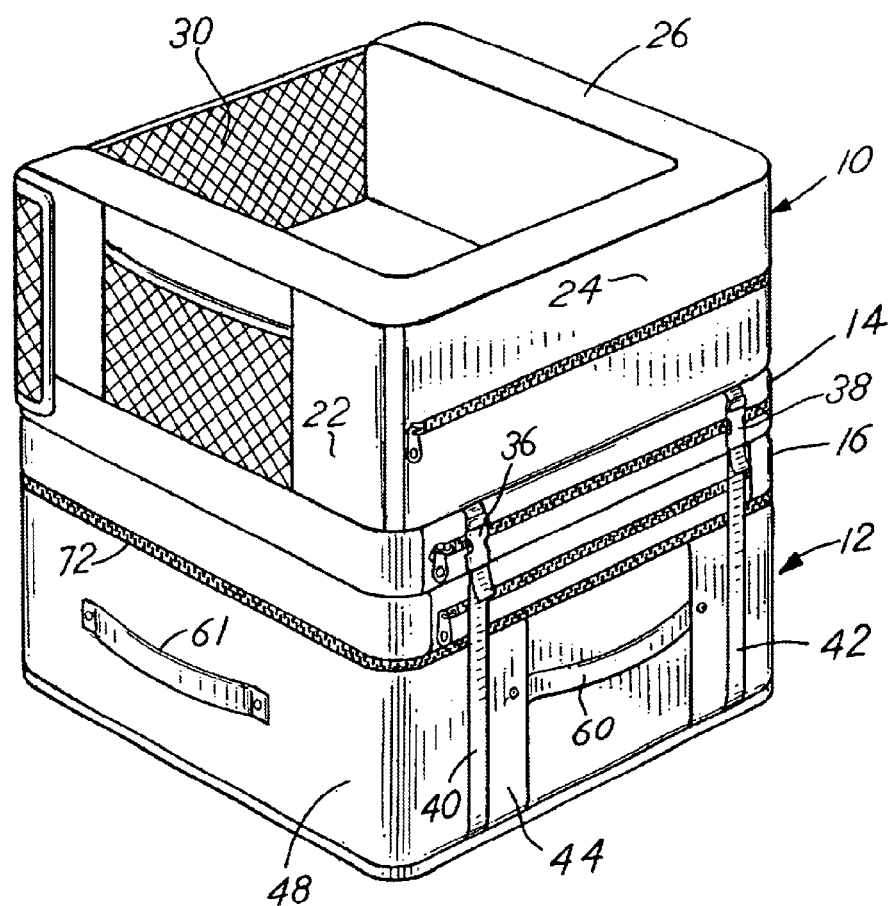
FIG. 5 is an isometric view of the carrying case of FIG. 1 as viewed from the opposite side of the carrying case in FIG. 1.

In a preferred embodiment, the material forming the cushions 14, 16, as well as the peripheral wall 20, is comprised of a compressible, polymeric material so that the assembly comprising the pet bed itself may be folded into a compact form and placed within the case 12 described hereinafter. It is to be noted that the first or top cushion 14 includes a set of buckles 36 and 38 along the back side thereof which are provided for cooperation with compatible buckles and straps 40, 42 such as shown in FIG. 5 on a back side wall 44 of the case 12.

Figure 3:
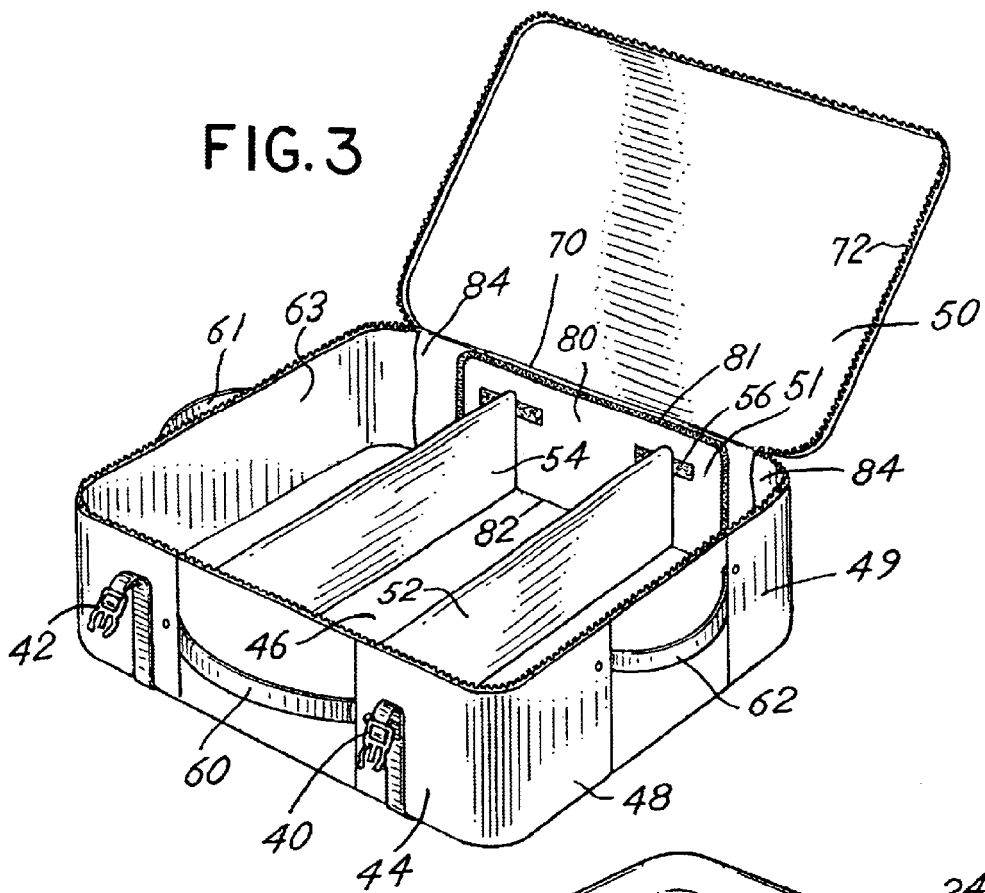
FIG. 3 is an isometric view of the carrying case.

The case 12 includes a bottom side wall 46, a peripheral side wall 48 and a top lid 50 hinged to the back side 44 or one side of the peripheral side wall 48. The case 12 has a size and shape that is generally congruent and compatible with and therefore enables storing the pet bed 10 therein when the bed 10 is folded and/or compressed. Foldable dividers 52 and 54 are provided within the interior of the case 12. The dividers 52 and 54 are held in vertical position as depicted in FIG. 3 by engagement of the ends of the dividers 52 and 54 with appropriate fasteners such as hook and eye type (Velcro) fasteners 56 on the interior of the peripheral side wall 48 of the case 12.

The outside of the side wall 48 of the case 12 includes a handle 60 in the back wall 44 for carrying of the case 12. An additional handle 62 is provided on a side or end wall 49 of the peripheral wall 48. A similar handle 61 is provided on the opposite side wall 63. The handles 62 and 60, as well as the handle 61 on the opposite side wall 63 from the handle 62, serve as loops for attachment of a vehicle seat belt case 12 to hold the case 12 in position on a vehicle seat and thereby stabilize the assembly for the safety of the pet retained in the pet bed mounted on top of the case 12. The case 12 thus serves as a base for the pet bed 10 as described hereinafter.

The interior of the case 12 includes divided sections or compartments created by the dividers 52 and 54 for the storage of items therein, such as food supplies, dog utensils and toys, etc. Dividers 52, 54 also provide additional support for the bed 10 on the lid 50 of case 12. The lid 50 is hinged by means of a flexible hinge 70 to the front side 51 of wall 48 and thus covers the interior of the case 12. A peripheral zipper 72 affixes the lid 50 to the top of the peripheral wall 48 to retain the lid 50 thereon.

First and second side straps 74 and 76 are provided on the outside face of the lid 50. The straps 74 and 76 are preferably elastomeric straps 74, 76 which fit over the second or bottom cushion 16 to hold the cushion 16 on the case 12 and thus hold the pet bed 10 on the case 12. When the second cushion 16 is inserted through the straps 74 and 76, then the buckles 36 and 38 are attached to the compatible buckle members 40 and 42 to thereby hold the pet bed 10 on the top of the case 12. In this manner, the bed 10 is fixed to the top of the case 12 and can only be removed when the buckles 36 and 38 are detached from buckles 40, 42 and the bottom cushion 16 is removed from engagement with the straps 74 and 76.

The peripheral side wall 48 includes an access panel 80 in the front side thereof for access to the interior of the case 12 when the bed 10 is fitted on top of the case 12. A zipper 81 in the peripheral side wall 48 enables release of panel 80 to fold down about a flexible hinge section 82. Side gussets 84 may be provided for attachment of the panel 82 to the peripheral side wall 48.

In review, the pet bed or seat 10 is the component that is compressible for storage in the case 12. The seat 10 can be removed, however, and the side wall 20 will then become erect to form a three-sided corral for a pet within the bed 10. A removable front panel 30 is provided to retain the pet for purposes of safety and control. A latch or buckle 90 is provided on the back side panel 24 of the side wall 20 to attach to a leash for the pet to secure the pet within the bed 10.

The hinged bottom cushion 16 of the bed 10 is fitted through the straps 74 and 76 when the bed 10 is retained on the case 12. The bed 10 is retained on the case 12 when the case 12 is fixed in the seat of a vehicle by means of the vehicle seat belts engaging handles, e.g. handle 62. The case 12 serves as a base to elevate the bed 10 holding the pet to view the environment through the windows of the vehicle.

Figure 4:
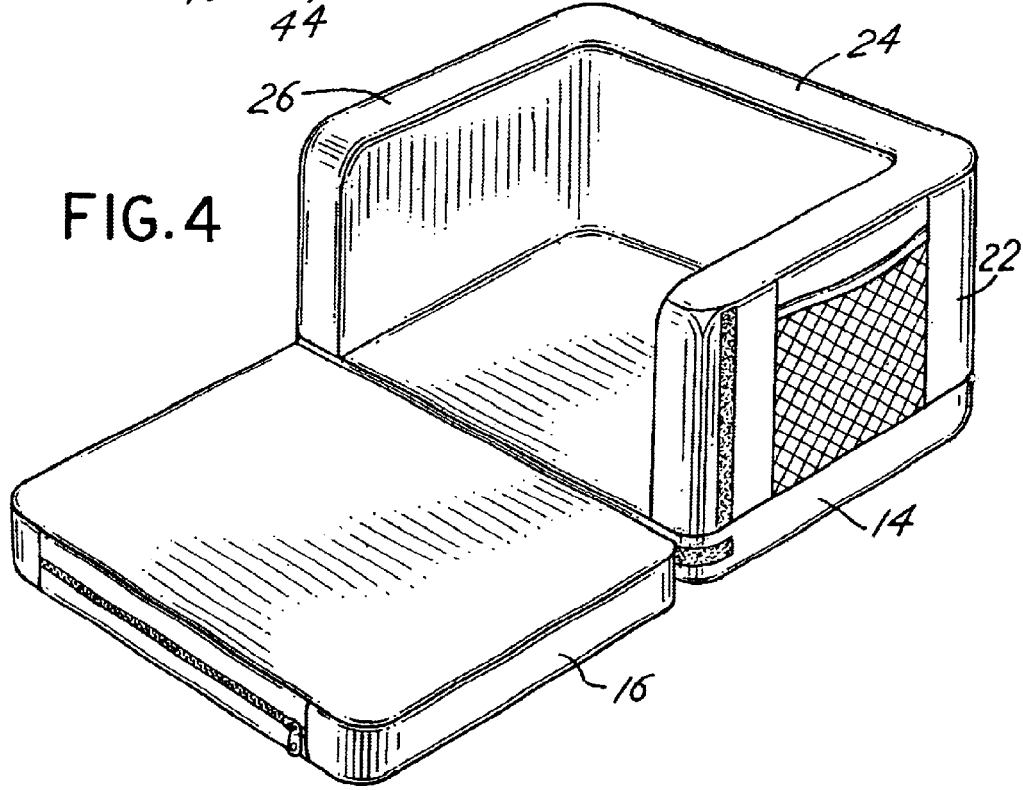
FIG. 4 is an isometric view of the pet bed wherein it is positioned independently from the carrying case as a lounge for the pet wherein the cushions forming the base of the pet bed are extended in a planar fashion.

The bed 10 may be totally removed from the case 12 and the hinged cushions 14 and 16 opened so there is a single thickness cushion forming a bed for the pet in the form of a chaise lounge (FIG. 4). In addition to utilization of the side handles, such as handles 60, 61 and 62 of the case to secure the case and thus the pet bed to the vehicle by means of a vehicle seat belt, optional loops 94 and 96 may be included on the back side of the wall 20 that forms the enclosure for the pet. Thus, wall 20 includes on its back side loops 94 and 96 for attachment to a seatbelt strap. There are various other alternative connection features and variations of the bed 10 and case 12 including mechanisms which may be utilized to provide for attachment of the pet bed 10 to the case 12 and the case 12 to the vehicle safety harnesses. Thus, the invention is to be limited only by the following claims and equivalents thereof.

What is claimed is:

1. A pet bed, car seat and carrying case comprising, in combination:

a seat assembly including a first base member having a top face, a bottom face, a forward edge side, and a generally parallel back edge side; a second base member hinged to the first base member forward edge side by a hinge connection; and a side wall mounted on the first base member top face extending at least partially around the circumference of the top face of the first base member along the back edge side to define a seat area on the top face of the first base member, said second base member foldable about the hinge connection to enable stacking of the first base member over the second base member with the side wall of the first base member forming the back support of a seat and the bottom face of the first base member against the second base member;

a separate case for the seat assembly, said case including a bottom side, a peripheral side attached to the bottom side, and a top side generally congruent with the bottom side and attachable to the peripheral side to form a storage enclosure sized for storage of the seat assembly, said case top side including an attachment mechanism for attaching the second base member to the top side of the case with the bottom face of the first base member overlying the second base member whereby the case defines a pedestal for the seat assembly; and a fastener on the first base member for attachment thereof to the case.

2. The combination of claim 1 wherein the attachment mechanism comprises at least one electrometric strap for fitting over the second base member to retain the second base member on the top side of the case.

3. The bed of claim 1 further including a fastener on the first cushion base for attachment to the case.

4. The combination of claim 1 wherein the fastener on said first base member is attachable to the peripheral wall of the case.

5. The combination of claim 1 wherein at least one of the first and second base members has a generally rectangular configuration.

6. The combination of claim 1 wherein the side wall extends around about 75% of the circumference of the first cushion base member.

7. The combination of claim 1 further including a removable retaining panel attached to the side wall to form an enclosure in combination with the side wall.

8. The combination of claim 1 wherein the case includes at least one divider in the enclosure.

9. The bed of claim 1 further including a fastener attached to the seat area.

10. The combination of claim 1 including a second fastener device on the bed for attachment to a vehicle seat belt.

11. The combination of claim 1 including an access panel in the peripheral side of the case for access to the case enclosure.

12. The combination of claim 1 wherein the second base member is a cushion.

13. The combination of claim 1 wherein the second base member may be pivoted about the hinge connection between a position wherein the first and second base members overlie each other and a position where the second base member comprises a generally planar extension of the first base member.

14. A combination pet bed, pet car seat and carrying case comprising, in combination:

a seat assembly including a first base member having a top face, a bottom face, a forward side edge and a back side edge, a second base member attached by a hinge connection to the first base member along the forward side edge, and a side wall mounted on the first base member extending at least partially around the circumference of the top face of the first base member along the back side edge to define a seat area on the top face of the first base member, said first base member foldable about the forward edge to overlie the bottom face thereof against the second base member with the side wall extending upwardly from the top face;

a separate case for the seat assembly, said case including a bottom side, a peripheral side attached to the bottom side, and a top side generally congruent with the bottom side and attachable to the peripheral side to form an enclosure for storage of the seat assembly, said case top side including an attachment mechanism for attaching the second base member positioned on the top side of the case whereby the case defines a pedestal for the seat assembly; and said second base member being detachable from the case, said detached second base member being pivotal about the hinge connection between a first position wherein the first and second base members overlie each other and a second position where the second base member comprises a generally planar extension of the first base member.

15. The combination of claim 14 wherein the attachment mechanism comprises at least one electrometric strap for fitting over the second base member to retain the second base member on the top side of the case.

16. The combination of claim 14 further including a fastener on the first base member for attachment thereof to the case.

17. The combination of claim 15 wherein the fastener is attachable to the peripheral wall of the case.

18. The combination of claim 14 wherein at least one of the first and second base members has a generally rectangular configuration.

19. The combination of claim 14 wherein the side wall extends around about 75% of the circumference of the first cushion base member.

20. The combination of claim 14 further including an at least partially removable retaining panel attached to the side wall to form a total enclosure in combination with the side cushion.

21. The combination of claim 14 wherein the case includes at least one divider in the enclosure.

22. The combination of claim 14 including a second fastener device on the bed for attachment to a vehicle seat belt.

23. The combination of claim 14 including an access panel in the peripheral side of the case for access to the case enclosure.

24. The combination of claim 14 wherein the second base member is a cushion.

25. A combination pet bed, pet car seat and carrying case comprising, in combination;

a case with a separate removable pet car seat storable therein, said case including a bottom side, a peripheral side and a top lid having an outside face, said lid hinged to the peripheral side for access to the interior of the case; and said pet car seat including a first, top cushion with a top face, a bottom face, a forward side edge and a back side edge, a second bottom cushion hinged by a hinge along the forward side edge to the top cushion and foldable between a first position with the top cushion bottom face over the bottom cushion and a second position with the bottom cushion extending as a generally planar extension of the top cushion, and a peripheral side wall affixed to and extending upwardly from the top face of the top cushion, said side wall, top cushion and bottom cushion foldable, and sized to fit within the interior of the case, the top lid of the case and the top cushion of the car seat including an attachment mechanism for mounting the seat on the outside face of the lid.

26. The combination of claim 25 wherein the attachment mechanism includes at least one electrometric strap for fitting over the bottom cushion to retain the bottom cushion on the top side of the case.

27. The combination of claim 25 further including a fastener on the top cushion for attachment of the car seat to the case.

28. The combination of claim 27 wherein the fastener is attachable to the peripheral side of the case.

29. The combination of claim 25 wherein the top and bottom cushions have a generally rectangular configuration.

30. The combination of claim 25 wherein the side wall extends around about 75% of the circumference of the top cushion.

31. The combination of claim 25 further including an at least partially removable retaining panel attached to the top cushion to form a total enclosure in combination with the side wall.

32. The combination of claim 25 wherein the case includes at least one divider in the enclosure.

33. The combination of claim 25 further including a leash attached to the car seat.

34. The combination of claim 25 including a fastener device for attachment to a vehicle seat belt.

35. The combination of claim 25 including an access panel in the peripheral side of the case for access to the interior of the case.

36. A combination pet bed and carrying case comprising, in combination:

a bed including a cushion, first base member with a top face and a bottom face, a forward edge and a back side edge, a side wall on the top face at the back side edge, a cushion, second base member hinged to the first base member along the forward edge by a hinge connection, said second base member foldable about the hinge connection between a generally planar extension of the first base member as a pet bed, and a position under the first base member with the bottom face positioned thereon; and a separate carrying case for the bed, said case including a bottom side, a lateral side affixed to the bottom side to define an enclosure for the bed, and a top lid for access to the enclosure, said top lid including a fastener mechanism for attachment to the second base member of the bed for holding the bed on the top lid and case and detachable to enable the bed to be placed in the case enclosure or folded as a bed.

37. The combination of claim 36 wherein the attachment mechanism includes at least one electrometric strap for fitting over the second cushion to retain the second cushion on the top side of the case.

38. The combination of claim 36 further including a fastener on the first base member for attachment of the car seat to the case.

39. The combination of claim 38 wherein the fastener is attachable to the peripheral side of the case.

40. The combination of claim 36 wherein the first and second base members have a generally rectangular configuration.

41. The combination of claim 36 including a side wall extending around about 75% of the circumference of the first cushion base member.

42. The combination of claim 41 further including an at least partially removable retaining panel attached to the first cushion base member to form a total enclosure in combination with the side wall.

43. The combination of claim 36 wherein the case includes at least one divider in the case.

44. The combination of claim 36 further including a leash attached to the bed.

45. The combination of claim 36 including a fastener device for attachment to a vehicle seat belt.

46. The combination of claim 36 including an access panel in the lateral side of the case for access to the interior of the case.

* * * * *